US007871260B2

(12) United States Patent
Boucherie

(10) Patent No.: US 7,871,260 B2
(45) Date of Patent: Jan. 18, 2011

(54) DEVICE FOR MANUFACTURING INJECTION MOULDING PIECES WITH TURRET HAVING HOLDERS

(75) Inventor: Bart Gerard Boucherie, Izegem (BE)

(73) Assignee: Firma G.B. Boucherie Naamloze Vennootschap, Izegem (BE)

( * ) Notice: Subject to any disclaimer, the term of this patent is extended or adjusted under 35 U.S.C. 154(b) by 0 days.

(21) Appl. No.: 12/085,183

(22) PCT Filed: Jan. 11, 2007

(86) PCT No.: PCT/BE2007/000007
§ 371 (c)(1),
(2), (4) Date: May 16, 2008

(87) PCT Pub. No.: WO2007/085063
PCT Pub. Date: Aug. 2, 2007

(65) Prior Publication Data
US 2009/0136610 A1 May 28, 2009

(30) Foreign Application Priority Data
Jan. 27, 2006 (BE) .................................. 2006/0055

(51) Int. Cl.
*B29C 45/04* (2006.01)
(52) U.S. Cl. .................... 425/548; 425/574; 425/575; 425/576
(58) Field of Classification Search ............. 425/548, 425/574, 575, 576
See application file for complete search history.

(56) References Cited
U.S. PATENT DOCUMENTS
3,707,591 A * 12/1972 Chalfant .................. 264/520
3,765,816 A * 10/1973 Dobbins .................. 425/575
4,449,913 A * 5/1984 Krishnakumar et al. ..... 425/548
4,836,767 A * 6/1989 Schad et al. ............... 425/552

(Continued)

FOREIGN PATENT DOCUMENTS
EP 1 782 936 A2 5/2007

(Continued)

OTHER PUBLICATIONS
Examination Report of European Patent Office regarding European Patent Application No. 07 701 583.2, Aug. 19, 2008.

*Primary Examiner*—Yogendra N Gupta
*Assistant Examiner*—Emmanuel S Luk
(74) *Attorney, Agent, or Firm*—Bacon & Thomas, PLLC

(57) ABSTRACT

Device (1) for manufacturing injection molding pieces (2) which mainly consists of a stack mold (3) with a central cubical part (4) and two mold impressions (9,10), whereby the device (1) is provided with a cooling station (15) and an ejection station (16) as well as four holders (17-20) for holding an injection molding piece (2), which are formed as a piece (17-20) which can be taken out of the cube and which partly co-determines a mold impression (9,10), and with means (24) to detach the holders (17-20) from the cube faces (5, 13, 6, 14) with mold impressions (9, 10) and to put them in the latter again, as well as means (25) to each time move the holders (17-20) a quarter of a turn to a following cube face (13, 6, 14, 5) after the injection molding.

11 Claims, 7 Drawing Sheets

U.S. PATENT DOCUMENTS

Figure 1:
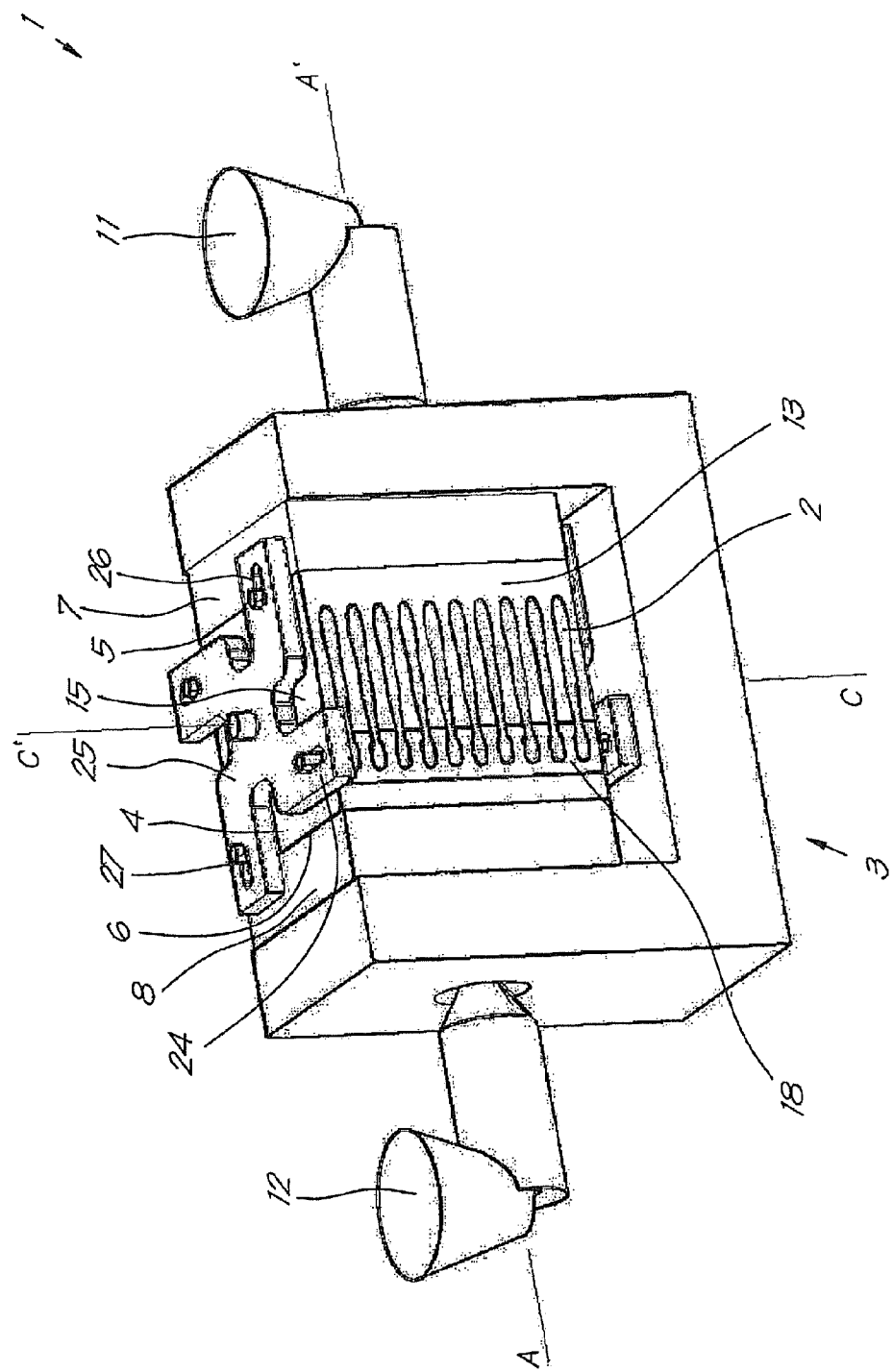

| | | | | |
|---|---|---|---|---|
| 5,569,476 A | * | 10/1996 | van Manen et al. | 425/556 |
| 5,609,890 A | * | 3/1997 | Boucherie | 425/120 |
| 5,750,162 A | * | 5/1998 | Schad et al. | 425/533 |
| 5,817,345 A | * | 10/1998 | Koch et al. | 425/130 |
| 6,143,225 A | * | 11/2000 | Domodossola et al. | 264/237 |
| 6,447,280 B1 | | 9/2002 | Grimm | |
| 6,817,855 B2 | * | 11/2004 | Unterlander et al. | 425/150 |
| 2002/0101005 A1 | | 8/2002 | Bodmer et al. | |
| 2003/0170339 A1 | * | 9/2003 | Ebner et al. | 425/556 |
| 2004/0012117 A1 | | 1/2004 | Mueller | |
| 2004/0094866 A1 | | 5/2004 | Boucherie | |
| 2006/0099297 A1 | * | 5/2006 | Shakal | 425/576 |
| 2006/0244178 A1 | | 11/2006 | Armbruster | |

FOREIGN PATENT DOCUMENTS

| | | |
|---|---|---|
| WO | WO 2005/000556 A2 | 1/2005 |
| WO | WO 2005/077637 A1 | 8/2005 |
| WO | WO 2007/082394 A1 | 7/2007 |

* cited by examiner

DEVICE FOR MANUFACTURING INJECTION MOULDING PIECES WITH TURRET HAVING HOLDERS

The present invention concerns a device for manufacturing injection moulding pieces.

In particular, the present invention concerns a device for manufacturing injection moulding pieces consisting of at least two components, whereby the device mainly consists of a stack mould, in particular a cube mould with a central cubical part upon which, opposite two opposite faces, mould parts are provided which can work in conjunction with the above-mentioned cube so as to form at least a first and a second mould impression, whereby the mould parts and the cube are erected such that they can move in relation to each other so as to open the mould.

Devices for manufacturing injection moulding pieces consisting of one or several components are already known, and they make it possible, for example, to form an injection moulding piece in the first mould impression out of a first component; to put this injection moulding piece in the second mould impression so as to form an injection moulding piece out of two components by applying a second component on the above-mentioned injection moulding piece made of one component.

The first and the second mould impressions are hereby usually situated in a single plane.

However, a disadvantage of these known devices is that the injection moulding pieces can only be taken out of the mould impressions after the injection moulding, for example to put them in a second mould impression for injection moulding the second component or to take them definitively out of the mould, as soon as the injection moulding pieces have sufficiently cooled or cured, such that the mould often must remain closed for a certain while.

Another disadvantage is that the injection moulding pieces are usually taken definitively out of the mould by means of an externally provided gripper or robot which must be provided between the two halves of the opened mould.

Precious time is lost in this way before the mould can be closed again and a new injection moulding cycle can start, which is disadvantageous to the productivity of the device and which also increases the production cost.

An additional disadvantage of the known devices is that the transposition of the injection moulding pieces from a first mould impression to a second mould impression and the correct positioning of the injection moulding piece in the second mould impression is often very complicated.

By manufacturing the mould as a cube mould, some of the above-mentioned disadvantages are partly remedied.

An additional disadvantage of these known cube moulds, whereby the cubical character of the mould must not be taken too literally, is that the forces which need to be exerted to hold the opposite mould parts and the cube together while injection-moulding the components in the mould impressions partly cancel out one another, which would not be the case if the first and the second mould impressions had been provided in one and the same plane.

However, a disadvantage of the known cube moulds is that, in order to position and move the injection moulding pieces, certain parts of the device, such as for example the cube itself, must be able to rotate or move, which parts are usually heavy and sizeable, which is disadvantageous to the energy consumption of such devices.

Also, the present invention aims to remedy one or several of the above-mentioned and other disadvantages.

Further, the present invention aims to obtain an injection moulding device which works fast and yet is compact and whose moving parts rather have a light and simple structure.

To this end, the invention concerns a device for manufacturing injection moulding pieces consisting of at least two components, whereby the device mainly consists of a stack mould, in particular a cube mould with a central cubical part upon which, opposite two opposite faces, mould parts are provided which can work in conjunction with the above-mentioned cube so as to form at least a first and a second mould impression, to form an injection moulding piece out of a first component and to apply a second component on the above-mentioned injection moulding piece made of a single component respectively, and whereby the mould parts and the cube can move in relation to each other so as to open the mould, whereby a cooling station and an ejection station are respectively provided on two surfaces between the above-mentioned opposite faces of the cube, and in that four holders are provided for holding the injection moulding pieces, which holders are positioned opposite the four faces of the cube, and which are formed as a piece which can be taken out of the cube which partly co-determines the first as well as the second mould impression, whereby the device is provided with means to detach the holders from the cube faces with mould impressions and to put them in the latter again, as well as means to each time move the holders a quarter of a turn to a following cube face after the injection moulding.

In this manner, it is possible to move the injection moulding pieces formed in the mould to the cooling station and the ejection station respectively, while the cooled, formed injection moulding pieces are simultaneously put in position for applying the second component, whereas, after the formed injection moulding pieces have been ejected in the ejection station, the released holder is moved to the first mould impression so as to form the following injection moulding piece out of a single component.

An advantage of this device according to the invention is that separate stations are provided for cooling and ejecting the injection moulding pieces, as a result of which an ejection moulding operation can be carried out during the cooling and the ejection, which of course promotes the speed of the injection moulding and consequently also lowers the production cost of the injection moulding pieces.

Another advantage of a device according to the invention is that, in order to move and to reposition the injection moulding pieces, use can be made of pieces which can be taken out of the cube, which enclose a common part of the mould impressions, which pieces are very light and compact, which is advantageous to the energy consumption of the device.

Moreover, the above-mentioned removable pieces are analogous to the rest of the mould impressions, such that injection moulding pieces can be easily removed without leaving any seams or the like.

Figure 3:
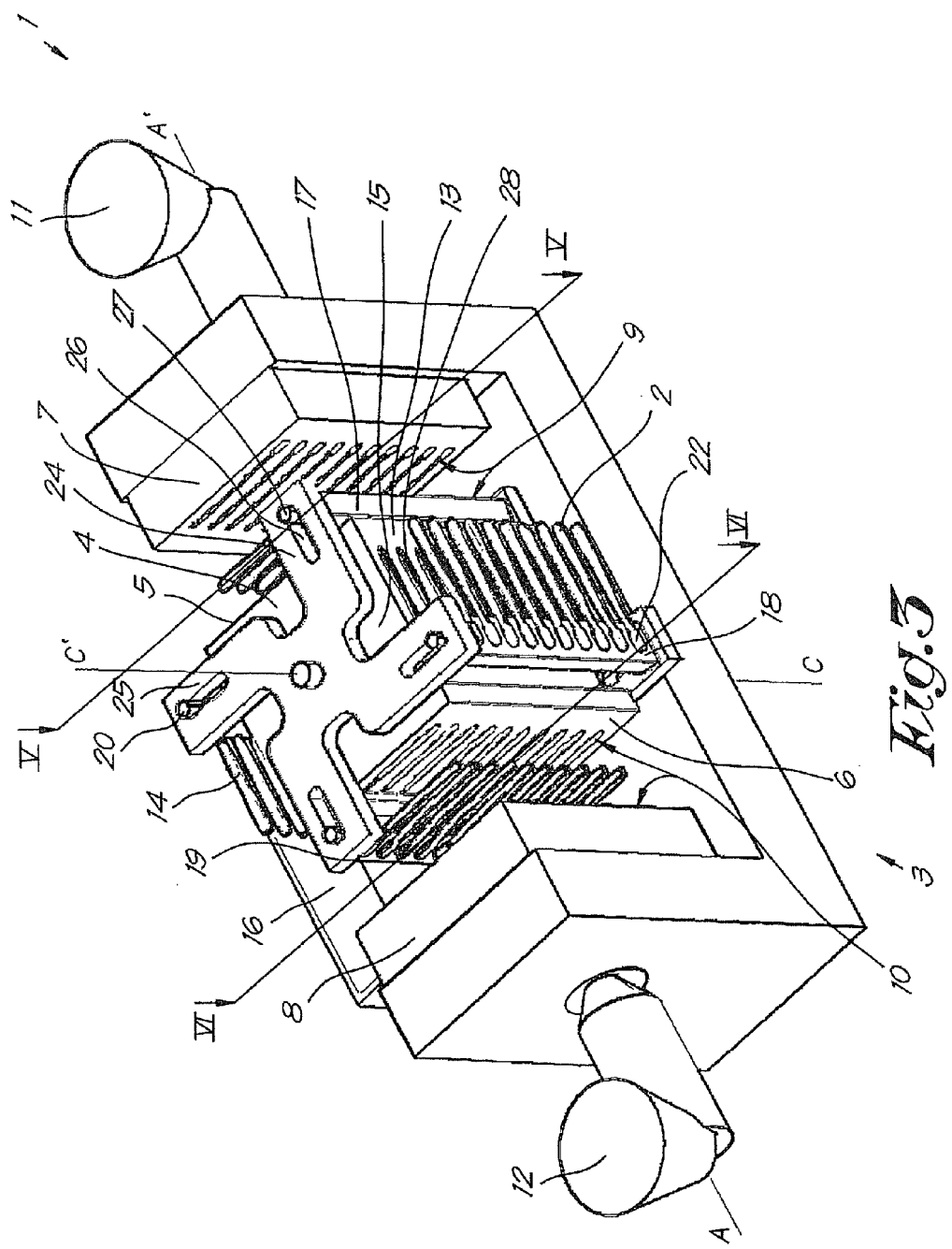
Figure 5:
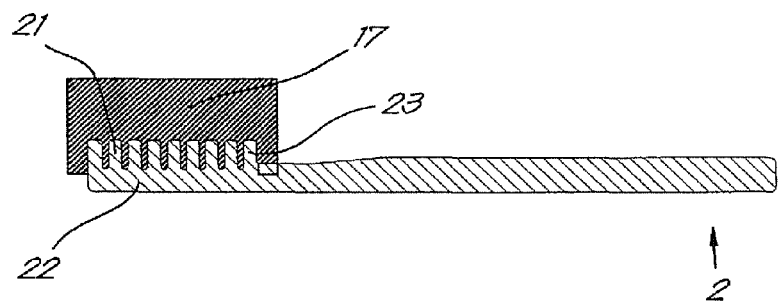
Figure 6:
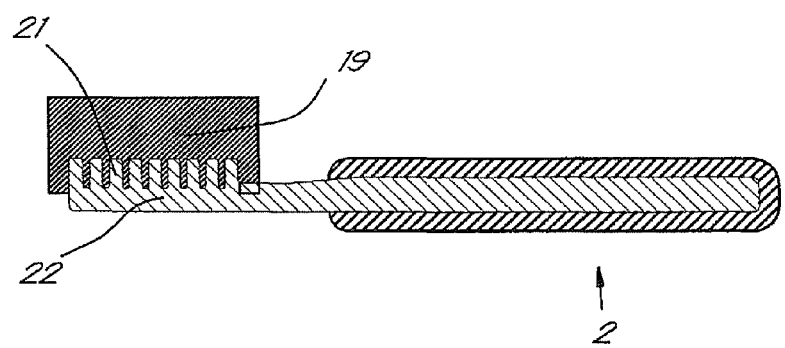
Figure 7:
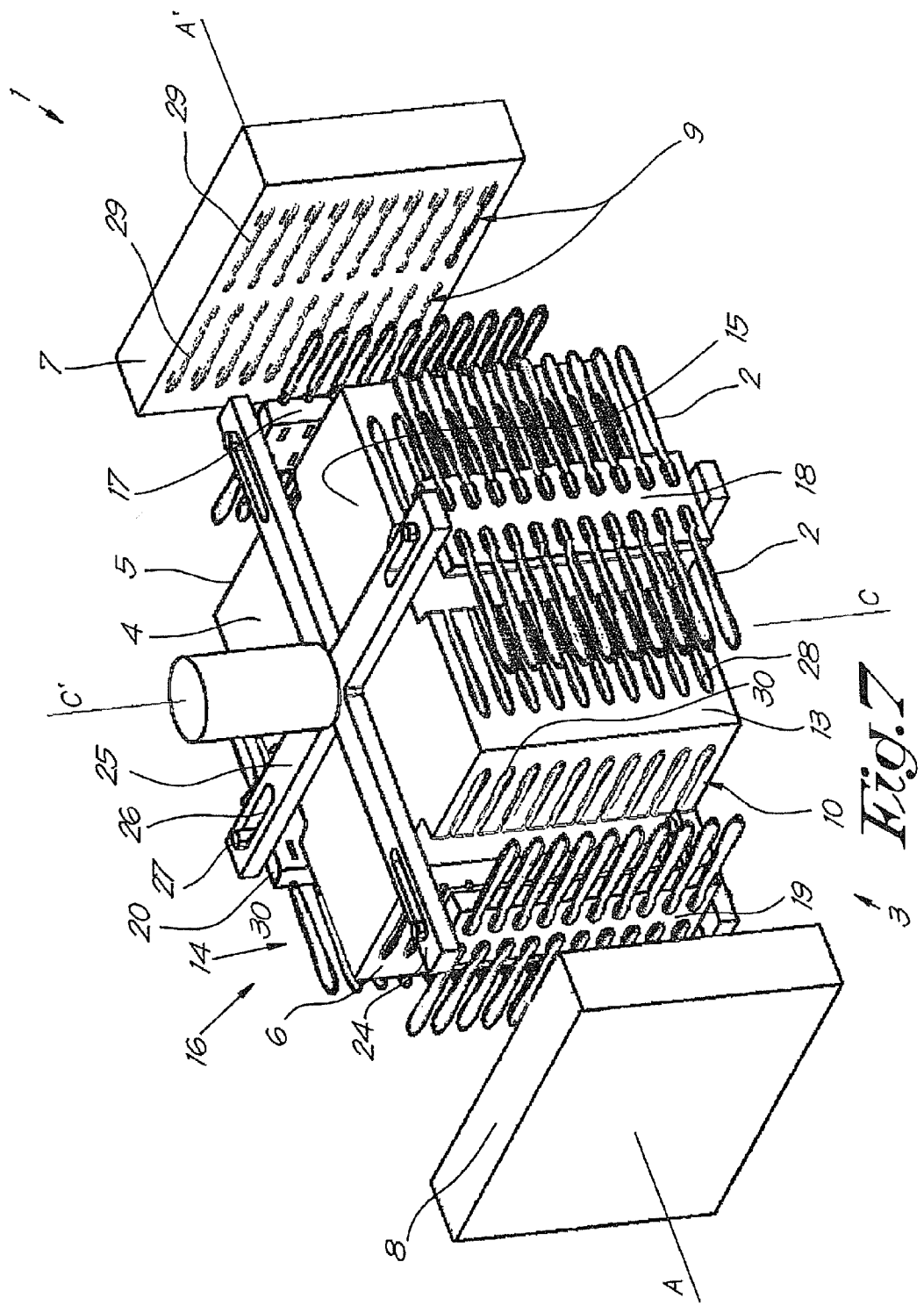
Figure 8:
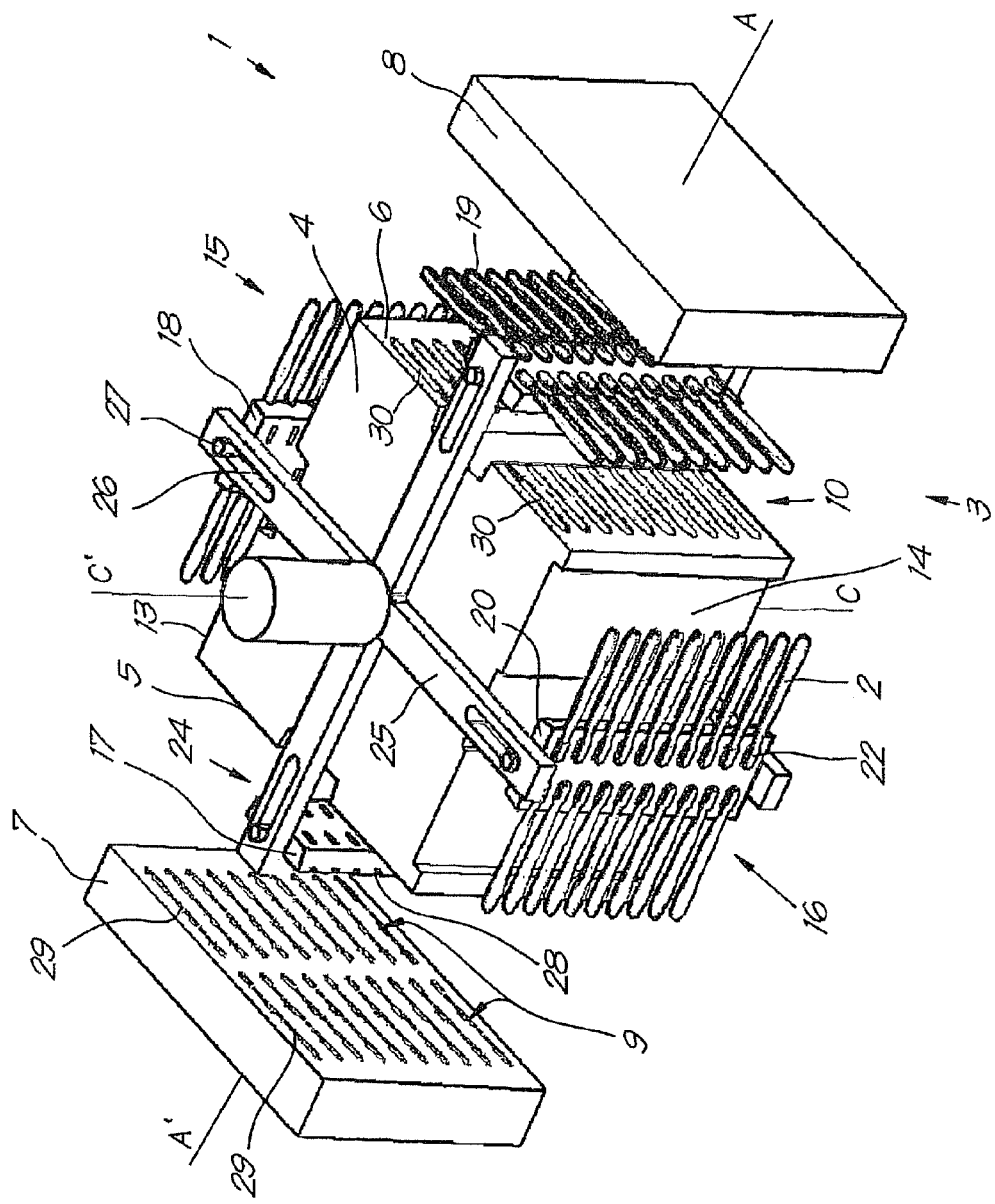

In order to better explain the characteristics of the invention, the following preferred embodiments are given as an example only without being limitative in any way, with reference to the accompanying drawings, in which:

FIGS. 1 to 4 schematically represent a device according to the invention seen in perspective, each time in another position;

FIGS. 5 and 6 are sections according to lines V-V and VI-VI respectively in FIG. 3; and FIGS. 7 and 8 schematically represent another embodiment of a device according to the invention, seen in perspective.

The embodiment of a device 1 according to the invention represented in FIGS. 1 to 4 is a device 1 for manufacturing injection moulding pieces 2, represented in FIG. 6, consisting of at least two components, in particular brush bodies 2 for tooth brushes, for example having a core made out of a first component, such as a harder plastic, sheathed with a handgrip made out of a second component, such as a softer plastic.

To this end, the device 1 mainly consists, as is known, of a stack mould 3, in particular a cube mould 3 with a central cubical part 4 upon which are provided, opposite two opposite faces 5 and 6, mould parts 7 and 8 respectively, which can work in conjunction with the above-mentioned cube 4 so as to form at least a series of first mould impressions 9 and 10 and a series of second mould impressions 10.

Figure 2:
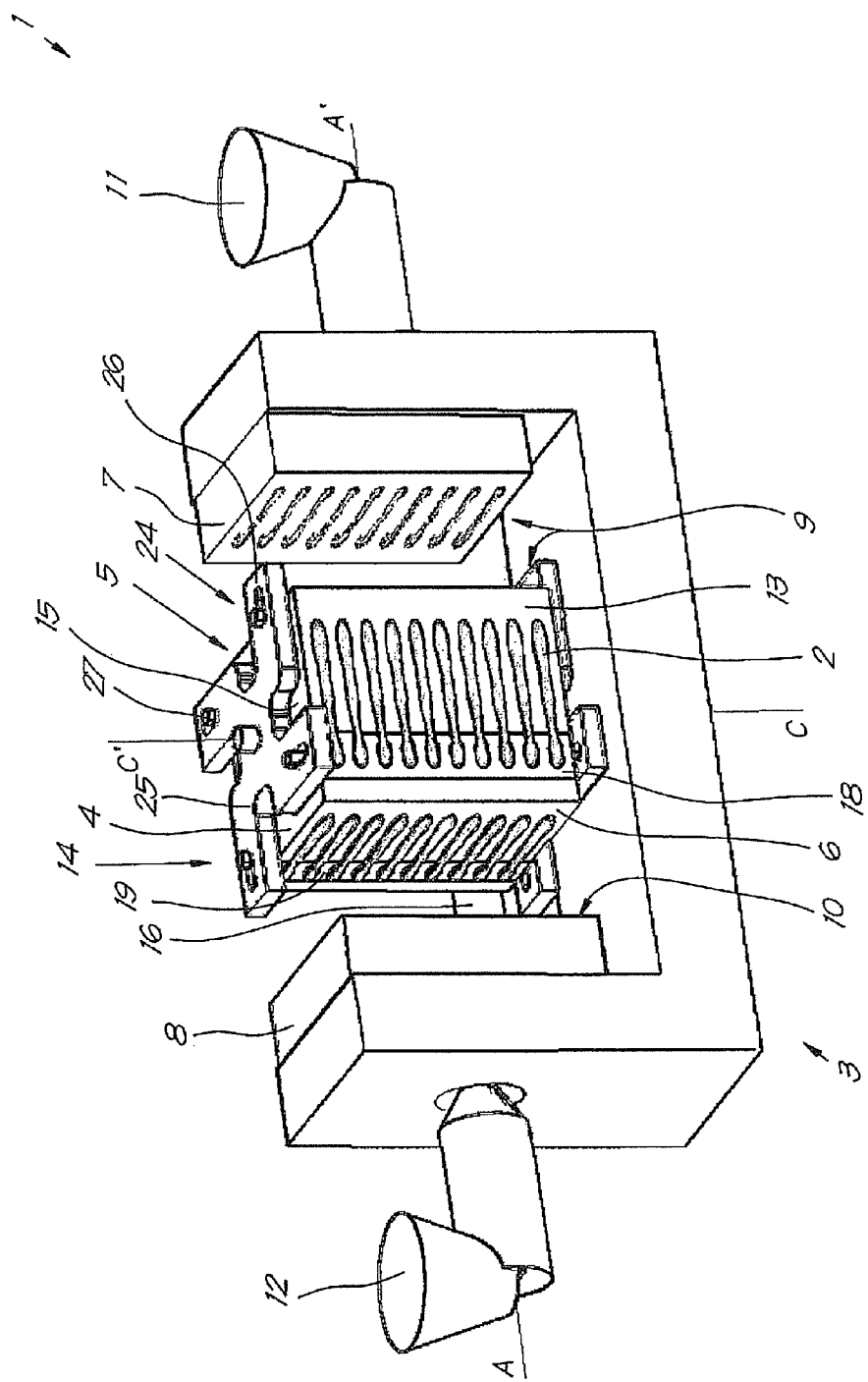
Figure 4:
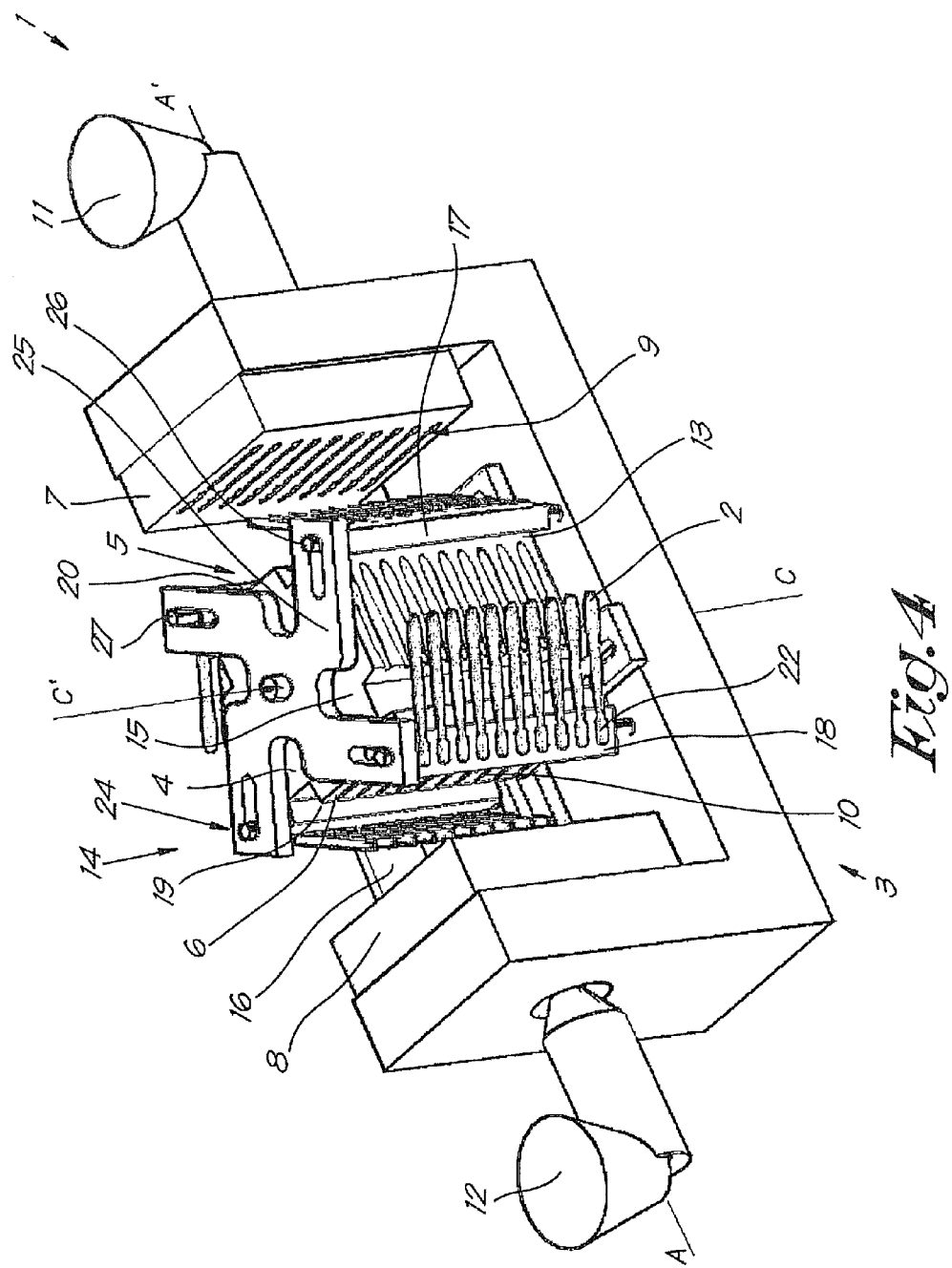

The mould parts 7 and 8 and the cube 4 are erected in a movable manner in relation to each other, such that the mould 3 can be opened and closed, in particular into a sealed position as represented in FIG. 1 and into an open position as represented in FIGS. 2 to 4.

This can be done for example by putting the mould part 8 in a fixed position in relation to a supporting structure, whereas a mechanism which is not represented in the figures and which is driven for example by a hydraulic cylinder or the like, moves the mould parts 7 and 8 apart in a direction AA' which is perpendicular to the above-mentioned opposite faces 5 and 6, whereby the mould 3 is opened at the series of second mould impressions 10 and the cube 4 is for example carried along, when the above-mentioned parts 7 and 8 have moved sufficiently away from each other, by the moving mould part 7 so as to open the mould 3 at the series of first mould impressions 9.

Naturally, many other mechanisms are possible, which are already known from the state of the art.

Further, two extrusion heads 11 and 12 are provided on the mould parts 7 and 8 of the device 1, for injecting the first and the second component into the series of mould impressions 9 and 10 respectively.

The position of the extrusion heads is hereby represented merely schematically on the mould parts 7 and 8.

They can also act elsewhere on the mould 3, whereby the components are guided to the series of mould impressions 9 and 10 by means of appropriate channels.

According to the invention, on the two surfaces 13 and 14 between the above-mentioned opposite faces 5 and 6 of the cube 4, are provided a cooling station 15 for cooling the injection moulding pieces 2 between the injection moulding of the first and the second component and which is integrated in the cube 4 in this case, as well as an ejection station 16 respectively, where the finished injection moulding pieces 2 can be recycled for further treatment.

Further, the device 1 according to the invention is provided with four holders 17 to 20 for maintaining the injection moulding pieces 2, which holders 17 to 20 are respectively positioned opposite four faces 5, 13, 6 and 14 of the cube 4 in their operational position.

Further, the holders 17 to 20 are made as a piece 17 to 20 which can be removed from the cube 4 and which partly co-determines the first as well as the second series of mould impressions 9 and 10.

As represented in FIGS. 5 and 6, the holders 17 to 20 can be provided for example with cavities 21, in which the head 22 of a brush body 2 for a tooth brush can be formed by means of injection moulding and whereby, in these holders 17 to 20, is provided a series of parallel pins 23 which extend over a certain length into the cavities and which are designed to form holes in the head 22 of the brush body 2 during the injection moulding, in which brush hairs can be provided at a later stage for example.

Such pins 23 can also make sure that an injection moulding piece 2, in this case a brush body, can be better maintained in the holders 17 to 20.

It is clear that, if the pins 23 are designed to improve the grip on the injection moulding piece 2 in the holders 17 to 20, also other holding means can be applied, such as for example clamping means, undercuts, sliding pieces or protrusions of any nature whatsoever.

Further, according to the invention, means 24 are also provided to detach the holders 17 to 20 from the cube faces 5, 13, 6 and 14 and to put them in the latter again, as well as means 25 to move the holders 17 to 20 a quarter of a turn each time after the injection moulding to a following cube face 13, 6, 14 and 5 respectively.

In the given example, the above-mentioned means consist of a turret 25 on which the holders 17 to 20 are provided.

This turret 25 is formed of a frame 25 which is erected such that it can rotate on the cube 4 according to a central axis CC' which is parallel to the above-mentioned cube faces 5, 6, 13 and 14, for example by means of an electric motor or the like which is not represented in the figures.

In the given example, the means 24 are formed of slots 26 in the frame 25, in which each holder 17 to 20 is provided in a sliding manner in a direction which is mainly perpendicular to the cube faces 5, 6, 13 and 14 by means of pins 27.

These means 24 further comprise one or several drives, for example in the form of hydraulically or pneumatically controlled cylinders, which for clarity's sake are not represented in the figures, so as to be able to push the holders 17 to 20 in the slots 26.

Although it is not strictly necessary according to the invention, the cube face 13 of the cooling station 15 is provided with a series of cavities 28 in the given example which preferably corresponds to the series of first mould impressions 9.

In this case, a part of the series of cavities 28 in the cube face 13 of the cooling station 15 is also formed of an above-mentioned piece 18 which can be removed from the cube 4 or a holder 18.

In the example as discussed here, the cooling is a water cooling which is formed of ducts, not visible in the figures, provided around the above-mentioned series of cavities 28 in the cube 4 and through which cooling water can flow.

The use and working of a device 1 according to the invention is simple and as follows.

In order to be able to injection mould, all the holders 17 to 20 are moved into the cube 4 first, into a position as represented in FIG. 2.

This can be done for example by first correctly positioning the holders 17 to 20 around the central axis CC' and by turning the frame 25, for example by means of an electric motor, after which the holders 17 to 20 are moved towards the central axis CC' by shifting the pins 27 in the slots 26, for example by means of hydraulic cylinders which act between the frame 25 and each pin 27.

After the mould 3 has been closed by moving the mould parts 7 and 8 and the cube 4 towards each other, a position as represented in FIG. 1 is obtained, after which the actual injection moulding can begin.

To this end, the first component and the second component are injected into the series of mould impressions 9 and 10 via extrusion heads 11 and 12 respectively.

The mould 3 can then be opened again by moving the mould parts 7 and 8 and the cube 4 away from each other, into a position as represented in FIG. 2.

The formed injection moulding pieces 2, in this case brush bodies for tooth brushes, are partly held in the holders 17 to 20, whereas the rest of the injection moulding pieces 2 is situated in the cavities in the cube face 5 or 6 concerned.

By now moving the pins 27 with which the holders 17 to 20 have been provided in the frame outward, i.e. away from the central axis CC', the injection moulding pieces 2 will be detached from their cube face 5 or 6 concerned, whereas the injection moulding pieces 2 will be held with the head of the brush body 2 in the holders 17 to 20.

It should be noted that, save for the part where the head 22 of the brush body 2 is fixed to the holder 17 to 20, the rest of the brush body 25—both in the front and at the back—is entirely released from the mould impressions 9 and 10.

This creates the possibility to provide the second component along both sides of the brush body 2.

This position is represented in FIG. 3.

A subsequent step consists in rotating the frame 25 a quarter of a turn, which movement is illustrated in FIG. 4 for an intermediate position of some 45°.

As a result, a position as represented in FIG. 3 is again obtained, whereby the injection moulding pieces 2 which are made of only a single component and which have been formed in the series of first mould impressions 9, are turned up to the surface 13 where the cooling station 15 is provided, however.

In an analogous manner, injection moulding pieces 2 made of a single component which had been previously formed and which were situated in the cooling station 15, were moved to the surface 6 with the series of second mould impressions 10, and injection moulding pieces 2 formed of two components were rotated up to the ejection station 16.

Finally, also the holder 20 at the ejection station 16, which had been stripped from any finished injection moulding piece made of two components in a preceding step, was taken up to the cube face 5 in which the series of first mould impressions 9 are situated.

By now moving the holders 17 to 20 into the cube 4 again, as explained in what precedes and which position is represented in FIG. 2, and by then closing the mould 3 again, as represented in FIG. 1, a subsequent injection moulding operation can be started.

Thus is obtained a cycle, whereby the mould 3 is closed first, the components are injected, the mould 3 is opened again, the injection moulding pieces 2 are rotated to a following cube face 5, 6, 13 and 14 by means of the holders 17 to 20 and the frame 25, where they are subjected to the following operation in the manufacturing process.

It is clear that in this manner, one can work very fast and efficiently, and no time is lost to cool or to eject the injection moulding pieces 2, since the cooling and ejecting takes place during the injection cycle.

Naturally, it is possible, when starting the device 1, to inject only a first component in the series of first mould impressions 9 via the extrusion head 11, so that material can be saved.

This is disadvantageous, however, in that before the start-up, a separate sequence must be worked out, which is usually much more expensive than merely injecting the second component the first time in the series of second mould impressions 10, which is not provided yet with an injection moulding piece 2 formed of the first component, and subsequently discharging the formed injection moulding pieces which are entirely made out of the second component.

FIG. 7 represents another embodiment of a device 1 according to the invention, whereby the difference with the preceding embodiment mainly consists in that the series of mould impressions 9 and 10 are formed of two series of cavities 29 and 30 for brush handles on either side of a centrally placed holder 17 to 20, whereby two series of cavities for the heads of the brush bodies are provided in these holders 17 to 20, such that one and the same holder 17 to 20 can hold and move twice as many injection moulding pieces 2.

FIG. 8 represents another embodiment of a device 1 according to the invention which has very much in common with the preceding embodiment of FIG. 7, but whereby the cube face 13 at the cooling station 15 is not provided with a series of mould impressions 28.

In this case, the injection moulding pieces 2 in the cooling station 15 are cooled by exposing them to the ambient air, either or not with an additional forced ventilation, for example coming from an electric fan.

In the same manner, also the cube face 14 where the ejection station 16 is situated can be made without the mould impressions 10.

Of course, the latter embodiments are advantageous in that they are easier to make and thus can be produced at a lower cost.

It is clear that also many other embodiments of a device 1 according to the invention are possible.

Thus, it is possible for example to open and close the mould 3 according to all sorts of alternative methods, for example by a rotation of the mould parts 7 and 8 in relation to the cube 4 or the like.

The injection moulding pieces 2 can also be moved in a thousand and one ways, for example by making use of simple mechanical methods, but just as well by implementing for example a robot which is controlled via a software package.

The present invention is by no means limited to the devices described as an example; on the contrary, such a device for manufacturing injection moulding pieces can be made according to different variants while still remaining within the scope of the invention.

The invention claimed is:

1. Device for manufacturing injection moulded articles having at least two components, comprising a stack mould comprising a cube mould having a central cubical part upon which, opposite two opposite faces, mould parts are provided which cooperate with said central cubical part so as to form at least a first and a second mould impression, for forming an injection molded article out of a first component and to apply a second component on the injection molded article made of a single component, respectively, and wherein the mould parts and the central cubical part are moveable relative to each other to enable opening the mould; a cooling station and an ejection station provided on two surfaces between the opposite faces of the central cubical part, and four holders arranged to hold an injection molded article, said holders being positioned opposite the four faces of the central cubical part, and being formed as a piece which can be taken out of the central cubical part which partly co-determines the first and second mould impressions; a turret comprising an external frame erected and arranged to rotate a quarter of a turn after each injection moulding, wherein the holders are shiftable so as to detach the holders from the cube faces, and to place the holders in the cube faces again after one quarter of a turn.

2. Device according to claim 1, wherein the holders are provided with holding devices with which an injection molded article is maintained in the holder while it is being moved.

3. Device according to claim 1, wherein the frame is rotatable in relation to the central cubical part about a central axis which extends parallel to the cube faces.

4. Device according to claim 1, wherein no mould impressions are provided in the cube face of the cooling station.

5. Device according to claim 4, wherein injection molded articles are cooled in the cooling station by exposing them to the ambient air.

6. Device according to claim 5, wherein the cooling is done in the ambient air using forced ventilation.

7. Device according to claim 1, wherein the cube face of the cooling station includes at least one cavity which corresponds to the first mould impression.

8. Device according to claim 7, wherein a part of the cavity in the cube face of the cooling station is formed of a part which can be separated from the central cubical part.

9. Device according to claim 7, including a water cooling arrangement around the cavity in the cooling station.

10. Device according to claim 1, wherein the cube face of the ejection station is not provided with a mould impression.

11. Device according to claim 1, wherein the holders are shiftable in a sliding manner in respective slots in the external frame.

* * * * *